US012650877B2

(12) United States Patent
Kim

(10) Patent No.: US 12,650,877 B2
(45) Date of Patent: Jun. 9, 2026

(54) TASK SCHEDULING BASED ON RATIO OF TASKS FOR AUTOMATED MACHINE LEARNING

(71) Applicant: Socra AI Inc., Seoul (KR)

(72) Inventor: Wan Soo Kim, Seoul (KR)

(73) Assignee: Socra AI Inc., Seoul (KR)

( * ) Notice: Subject to any disclaimer, the term of this patent is extended or adjusted under 35 U.S.C. 154(b) by 823 days.

(21) Appl. No.: 17/863,816

(22) Filed: Jul. 13, 2022

(65) Prior Publication Data

US 2023/0015759 A1 Jan. 19, 2023

(30) Foreign Application Priority Data

Jul. 14, 2021 (KR) ........................ 10-2021-0091991

(51) Int. Cl.
G06F 9/48 (2006.01)
G06F 9/50 (2006.01)
G06F 11/30 (2006.01)
G06N 3/0985 (2023.01)

(52) U.S. Cl.
CPC .......... G06F 9/4881 (2013.01); G06F 9/5027 (2013.01); G06F 9/505 (2013.01); G06F 9/5066 (2013.01); G06F 9/5077 (2013.01); G06F 11/3024 (2013.01); G06N 3/0985 (2023.01); *G06F 2209/505* (2013.01); *G06F 2209/508* (2013.01)

(58) Field of Classification Search
None
See application file for complete search history.

(56) References Cited

U.S. PATENT DOCUMENTS

| | | | | |
|---|---|---|---|---|
| 7,984,447 | B1 * | 7/2011 | Markov | ................. G06F 9/505 709/201 |
| 11,023,281 | B2 * | 6/2021 | Kokubo | ............... G06F 9/5077 |
| 11,463,506 | B2 * | 10/2022 | Huang | .................. G06F 9/5038 |
| 11,966,783 | B1 * | 4/2024 | Lin | ....................... G06F 9/4881 |

(Continued)

FOREIGN PATENT DOCUMENTS

| | | |
|---|---|---|
| KR | 10-0646383 B1 | 11/2006 |
| KR | 10-2017-0116439 A | 10/2017 |

(Continued)

OTHER PUBLICATIONS

International Search Report issued Sep. 28, 2022 in International Application No. PCT/KR2022/009861.

(Continued)

*Primary Examiner* — Abu Zar Ghaffari
(74) *Attorney, Agent, or Firm* — USX IP LLC

(57) ABSTRACT

A method for scheduling a task for AutoML (Automated Machine Learning) by a terminal, includes: setting a ratio of 1) a first task requiring a plurality of arithmetic devices and 2) a second task requiring one arithmetic device, in a cluster connected with the terminal; allocating a third task for the AutoML on the basis of the set ratio; receiving a request for allocation of a session from a user; inspecting whether the session is allocable on the basis of the ratio of the second task; and allocating the session to the arithmetic device associated with the second task on the basis of the ratio of the second task when the session is allocable.

12 Claims, 5 Drawing Sheets

(56)                  References Cited

U.S. PATENT DOCUMENTS

| | | | |
|---|---|---|---|
| 2011/0161978 A1* | 6/2011 | Jang | G06F 9/505 |
| | | | 718/104 |
| 2014/0137131 A1* | 5/2014 | Dheap | G06F 9/5005 |
| | | | 718/104 |
| 2014/0181839 A1* | 6/2014 | Xu | G06F 9/505 |
| | | | 718/107 |
| 2016/0266932 A1* | 9/2016 | Phelan | G06F 9/5027 |
| 2018/0262559 A1* | 9/2018 | Arya | G06F 16/95 |
| 2019/0266015 A1* | 8/2019 | Chandra | G06F 9/4843 |
| 2019/0332441 A1* | 10/2019 | Fachini | G06F 9/5055 |
| 2020/0042153 A1* | 2/2020 | Yang | G06F 3/0412 |
| 2020/0125545 A1 | 4/2020 | Idicula et al. | |
| 2021/0103852 A1* | 4/2021 | Kamenetskaya | G06F 9/505 |
| 2021/0168827 A1* | 6/2021 | Shin | G06F 9/4881 |
| 2021/0240525 A1* | 8/2021 | Liu | G06F 9/4843 |
| 2022/0083378 A1* | 3/2022 | Morris | G06F 9/5005 |
| 2022/0261292 A1* | 8/2022 | Grabarsky | G06F 9/5083 |
| 2022/0405133 A1* | 12/2022 | Kalmuk | G06F 9/505 |

FOREIGN PATENT DOCUMENTS

| | | |
|---|---|---|
| KR | 10-2021-0086448 A | 7/2021 |
| KR | 10-2384821 B1 | 4/2022 |

OTHER PUBLICATIONS

Office Action issued Mar. 18, 2024 in Korean Application No. 10-2022-0042257.

Kim Wansoo, "Ray: Scalable High Performance Distributed/Parallel Machine Learning Framework", Riiid Teamblog, Dec. 17, 2020 (26 pages total).

* cited by examiner

TASK SCHEDULING BASED ON RATIO OF TASKS FOR AUTOMATED MACHINE LEARNING

BACKGROUND OF THE INVENTION

Field of the Invention

The present specification relates to a task scheduling method for allocating an AutoML (Automated Machine Learning) trial in a multi GPU (Graphics Processing Unit) environment and an apparatus therefor.

Description of the Related Art

Meta learning means an artificial intelligence system that learns by itself only with given data and environment. Through the meta learning, an artificial intelligence model may solve a new problem by applying previously learned information and algorithm to the new problem.

As an example of a meta learning method, automated machine learning (AutoML) is a method of automatically selecting human selection in the course of existing machine learning. For example, the automated machine learning may be applied to hyper parameter optimization (HPO), neural architecture search (NAS), and the like. The goal of such automated machine learning is to maximize the performance for a given task, and to reduce the cost of reaching the performance by searching the search range more efficiently compared to human selection.

More specifically, in order to use data about machine learning, an expert may apply data pre-processing, feature engineering, feature extraction, and feature selection.

After performing such a step, the expert may select an algorithm and optimize hyper parameters to maximize predictive performance of a model. The AutoML may simplify the above steps if not an expert.

SUMMARY OF THE INVENTION

An object of the present specification is to propose a method for improving the resource efficiency of a system having a GPU cluster.

In addition, another object of the present specification is to propose a method for efficiently operating an AutoML task by monitoring and automatically allocating unused idle resources.

Technical problems which the present specification is to achieves are not limited to the above-mentioned technical problems, and other technical problems not mentioned will be clearly understood by those of ordinary skill in the art to which the present specification belongs from the detailed description of the following specification.

According to an aspect of the present specification, there is provided a method for scheduling a task for AutoML (Automated Machine Learning) by a terminal, including: a step of setting a ratio of 1) a first task requiring a plurality of arithmetic devices and 2) a second task requiring one arithmetic device, in a cluster connected with the terminal; a step of allocating a third task for the AutoML on the basis of the set ratio; a step of receiving a request for allocation of a session from a user; a step of inspecting whether the session is allocable on the basis of the ratio of the second task; and a step of allocating the session to the arithmetic device associated with the second task on the basis of the ratio of the second task when the session is allocable.

In addition, in the step of setting the ratio, the ratio of the first task may be set to be greater than or equal to the ratio of the second task on the basis of the size of the cluster.

In addition, the scheduling method may further include a step of allocating the session to the arithmetic device associated with the first task on the basis of the ratio of the second task when the session is not allocable.

In addition, the scheduling method may further include a step of terminating the first task on the basis of resources required for the session, and the first task may require resources equal to or greater than the resources.

In addition, the scheduling method may further include: a step of monitoring a utilization rate of the cluster; and a step of terminating a session of the cluster with the utilization rate of 0 on the basis of the monitoring result.

In addition, the scheduling method may further include a step of allocating a fourth task for the AutoML to the cluster including the terminated session on the basis of the set ratio.

According to another aspect of the present specification, there is provided a terminal which schedules a task for AutoML (Automated Machine Learning), including: a memory; a communication module; and a processor which functionally controls the memory and the communication module, wherein the processor sets a ratio of 1) a first task requiring a plurality of arithmetic devices and 2) a second task requiring one arithmetic device, in a cluster connected with the terminal, allocates a third task for the AutoML on the basis of the set ratio, receives a request for allocation of a session from a user; inspects whether the session is allocable on the basis of the ratio of the second task; and allocates the session to the arithmetic device associated with the second task on the basis of the ratio of the second task when the session is allocable.

Figure 1:
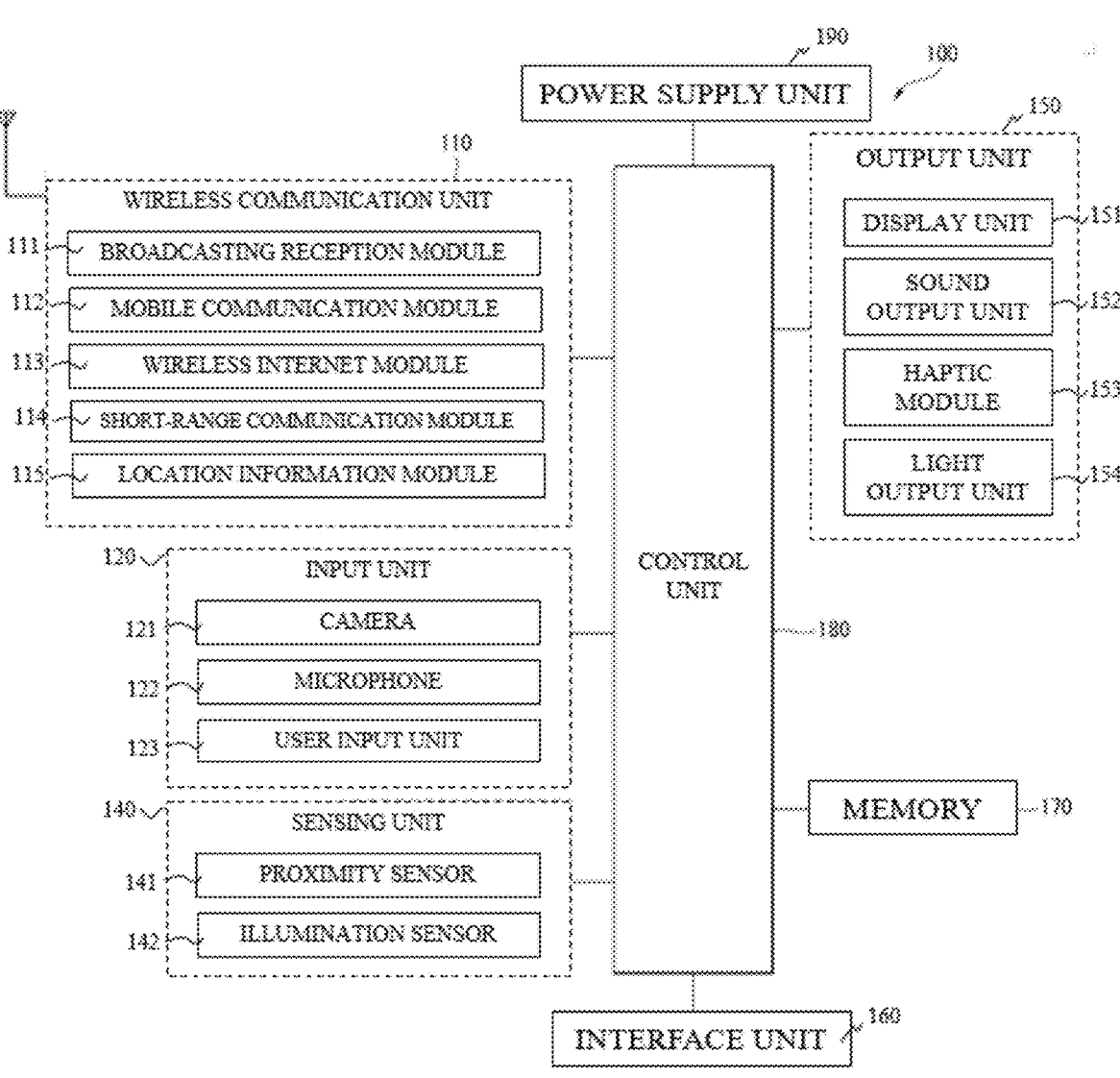
FIG. 1 is a block diagram illustrating an electronic apparatus related to the present specification.

The accompanying drawings, which are included as a part of the detailed description to help the understanding of the present specification, provide embodiments of the present specification, and together with the detailed description, explain the technical features of the present specification.

DETAILED DESCRIPTION OF THE PREFERRED EMBODIMENTS

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical idea disclosed in the present specification is not limited by the accompanying drawings, and should be understood to include all changes, equivalents, or substitutes included in the spirit and scope of the present specification.

Terms including an ordinal number, such as first, second, etc., may be used to describe various components, but the components are not limited by the terms. The above terms are used only for the purpose of distinguishing one component from another.

When a certain component is referred to as being "connected" or "linked" to another component, it may be directly connected or linked to the other component, but it should be understood that other components may exist in between. On the other hand, when it is mentioned that a certain component is "directly connected" or "directly linked" to another component, it should be understood that no other component exist in between.

The singular expression includes the plural expression unless the context clearly dictates otherwise.

In the present application, terms such as "include" or "have" are intended to designate that the features, numbers, steps, operations, components, parts, or combinations thereof described in the specification exist, but it should be understood that the possibility of presence or addition of one or more other features, numbers, steps, operations, components, parts, or combinations thereof is not excluded.

FIG. 1 is a block diagram illustrating an electronic apparatus according to the present specification.

The electronic apparatus 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential in implementing the electronic apparatus, and the electronic apparatus described in the present specification may have more or fewer components than the components listed above.

More specifically, the wireless communication unit 110 of the components may include one or more modules which enable wireless communication between the electronic apparatus 100 and a wireless communication system, between the electronic apparatus 100 and another electronic apparatus 100, or between the electronic apparatus 100 and an external server. In addition, the wireless communication unit 110 may include one or more modules which connect the electronic apparatus 100 to one or more networks.

Such a wireless communication unit 110 may include at least one of a broadcasting reception module 111, a mobile communication module 112, a wireless internet module 113, a short-range communication module 114, and a location information module 115.

The input unit 120 may include a camera 121 or an image input unit for inputting an image signal, a microphone 122 or an audio input unit for inputting an audio signal, and a user input unit 123 (e.g., touch key, push key (mechanical key), etc.) for receiving information from a user. Voice data or image data collected by the input unit 120 may be analyzed and processed by a control command of a user.

The sensing unit 140 may include one or more sensors for sensing at least one of information in the electronic apparatus, surrounding environment information around the electronic apparatus, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (e.g., camera 121), a microphone 122, a battery gauge, an environment sensor (e.g., barometer, hygrometer, thermometer, radiation detection sensor, heat detection sensor, and gas detection sensor), and a chemical sensor (e.g., electronic nose, healthcare sensor, and biometric sensor). Meanwhile, the electronic apparatus disclosed in the present may utilize combination of information sensed by at least two sensors of such sensors.

The output unit 150 is to generate an output related to sight, hearing, touch, or the like, and may include at least one of a display unit 151, a sound output unit 152, a haptic module 153, and a light output unit 154. The display unit 151 has an inter-layer structure with a touch sensor or is formed integrally, thereby implementing a touch screen. Such a touch screen may serve as a user input unit 123 providing an input interface between the electronic apparatus 100 and a user, and may provide an output interface between the electronic apparatus 100 and the user.

The interface unit 160 serves as a passage with various kinds of external apparatus connected to the electronic apparatus 100. Such an interface unit 160 may include at least one of a wired/wireless headset port, an external charger port, a wired/wireless data port, a memory card port, a port connecting a device provided with an identification module, an audio I/O (Input/Output) port, a video I/O (Input/Output) port, and an earphone port. The electronic apparatus 100 may perform a proper control related to a connected external apparatus in response to connecting an external apparatus to the interface unit 160.

In addition, the memory 170 stores data supporting various functions of the electronic apparatus 100. The memory 170 may store a number of programs (application program or application) running in the electronic apparatus 100, data for operation of the electronic apparatus 100, and commands. At least a part of such application programs may be downloaded from an external server through wireless communication. In addition, at least a part of such application programs may exist on the electronic apparatus 100 from the time of shipment for basic functions (e.g., call receiving and sending functions, and message receiving and sending functions) of the electronic apparatus 100. Meanwhile, the application programs may be stored in the memory 170, installed on the electronic apparatus 100, and driven to perform operations (or functions) of the electronic apparatus by the control unit 180.

In addition to the operations related to the application programs, the control unit 180 generally controls overall operations of the electronic apparatus 100. The control unit 180 may provide or process appropriate information or functions to a user by processing signals, data, information, and the like input or output through the components described above or running the application programs stored in the memory 170.

In addition, the control unit 180 may control at least a part of the components described with reference to FIG. 1 to run the application programs stored in the memory 170. Furthermore, in order to run the application programs, the control unit 180 may operate at least two components included in the electronic apparatus 100 in combination with each other.

The power supply unit 190 receives external power and internal power and supplies power to each component included in the electronic apparatus 100 under the control of the control unit 180. Such a power supply unit 190 may include a battery, and the battery may be a built-in battery or a replaceable battery.

At least a part of the components may be operated cooperatively with each other to implement an operation, control, or control method of the electronic apparatus according to various embodiments described hereinafter. In addition, the operation, control, or control method of the electronic apparatus may be implemented on the electronic apparatus by running at least one application program stored in the memory 170.

In the present specification, the electronic apparatus 100 may be collectively referred to as a terminal.

Figure 2:
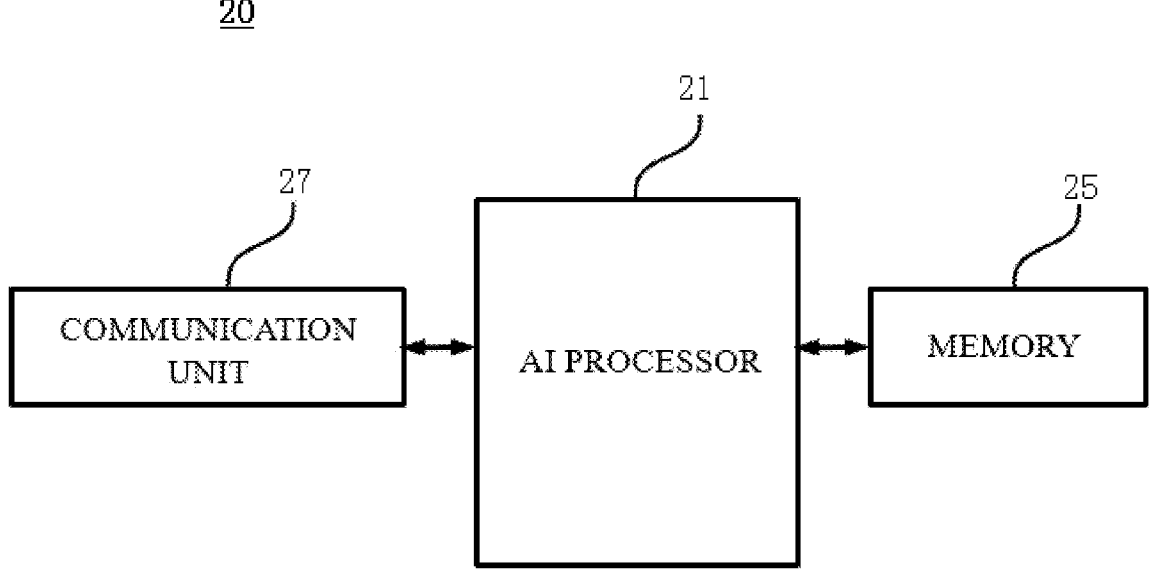
FIG. 2 is a block diagram illustrating an Artificial Intelligence (AI) device according to an embodiment of the present specification.

FIG. 2 is a block diagram illustrating an AI device according to an embodiment of the present specification.

The AI device 20 may include an electronic apparatus including an AI module capable of AI processing or a server including the AI module. In addition, the AI device 20 may be included as at least a part of the composition of the electronic apparatus 100 illustrated in FIG. 1, and perform at least a part of the AI processing together.

The AI device 20 may include an AI processor 21, a memory 25, and/or a communication unit 27.

The AI device 20 is a computing device capable of learning a neural network and may be implemented by various electronic device such as a server, a desktop PC, a laptop PC, and a tablet PC.

The AI processor 21 may learn a neural network using a program stored in the memory 25. Particularly, the AI processor 21 may create an automated machine learning (AutoML) model.

Meanwhile, the AI processor 21 performing the functions described above may be a general purpose processor (e.g., CPU), but may be an AI dedicated processor (e.g., GPU) for artificial intelligence learning.

The memory 25 may store various kinds of programs and data necessary for operation of the AI device 20. The memory 25 may be implemented by a non-volatile memory, a volatile memory, a flash memory, a hard disk drive (HDD), a solid state drive (SSD), and the like. The memory 25 may be accessed by the AI processor 21, and the AI processor 21 may perform reading, recording, modifying, deleting, updating, and the like of data. In addition, the memory 25 may store a neural network model (e.g., deep learning model) created through a learning algorithm for data classification/recognition according to an embodiment of the present specification.

Meanwhile, the AI processor 21 may include a data learning unit which trains a neural network for data classification/recognition. For example, the data learning unit may acquire training data to be used for learning, and apply the acquired training data to a deep learning model, thereby training the deep learning model.

The communication unit 27 may transmit an AI processing result of the AI processor 21 to an external electronic apparatus.

Herein, the external electronic apparatus may include another terminal and server.

Meanwhile, the AI device 20 illustrated in FIG. 2 has been functionally divided into the AI processor 21, the memory 25, the communication unit 27, and the like, but the components described above may be integrated into one module and may be referred to as an AI module.

In the field of machine learning, a hyperparameter (HP) is not determined by learning and is a value which should be manually determined by a user. Since such an HP has large and small effect on the performance of a model, setting the most efficient HP may achieve higher machine learning performance. For example, the process or action of finding an efficient HP may be referred to as HP search or HPO.

To this end, the most common methodology is manual search, which performs HPO while manually changing the HPO according to the researcher's experience and intuition. However, the manual search requires human resources of researchers, and has disadvantages in that the HPO process cannot be automated. In order to compensate for such disadvantages, various algorithms that can automate HPO such as random search, grid search, and Bayesian search have been proposed.

However, in general, the above algorithms can verify another HP only after verification of one HP set is completed. In other words, since the above algorithms perform sequential search, many HP sets cannot be searched simultaneously. In order to supplement the above problems, various Parallel Search algorithms and Schedulers have been developed.

For example, the parallel search searches in parallel a plurality of HP sets from a lot of computing resources. In the case of deep learning, since it takes a lot of time to verify one HP set, learning of an HP set that seems unnecessary or inefficient should be terminated early.

As another example, the scheduler aggregates information of trial that is searching a plurality of HP sets in parallel, and terminates learning of an HP set which is likely to be an inefficient HP set early, thereby searching many HP sets in a relatively short time. Such algorithms may be provided as various libraries such as HyperOpt, Optuna, and Ray Tune.

In general, a lot of cloud computing resources are used in software engineering, but a very high cost should be paid when GPUs necessary for deep learning research are rented from cloud. Accordingly, many research companies configure an on-premise GPU server and utilize it for research, instead of using cloud GPUs for research purpose.

However, a GPU cluster used only for the research purpose is not utilized during non-business hours such as late evenings or weekends, resulting in a lot of idle resources. Existing systems have no way to recognize and utilize such idle resources, so the retained resources may be wasted.

For example, since all of the existing HPO libraries such as RayTune, Optuna, and HyperOpt support the parallel search, large scale search is possible. However, since theses libraries use only resources arbitrarily designated before the start of search, Scale In/Scale Out are impossible during the search.

Accordingly, even when an idle resource occurs in the retained computing resource, it cannot be used immediately. For example, a population-based training (PBT) series algorithm, which is one of the most effective algorithms in the parallel search, cannot stop even a part of running HPO, so when a researcher needs a specific resource, it cannot be allocated immediately. In order to solve this, in the present specification, a method that flexibly enables the Scale In/Scale Out and performs efficient HPO search is proposed.

Figure 3:
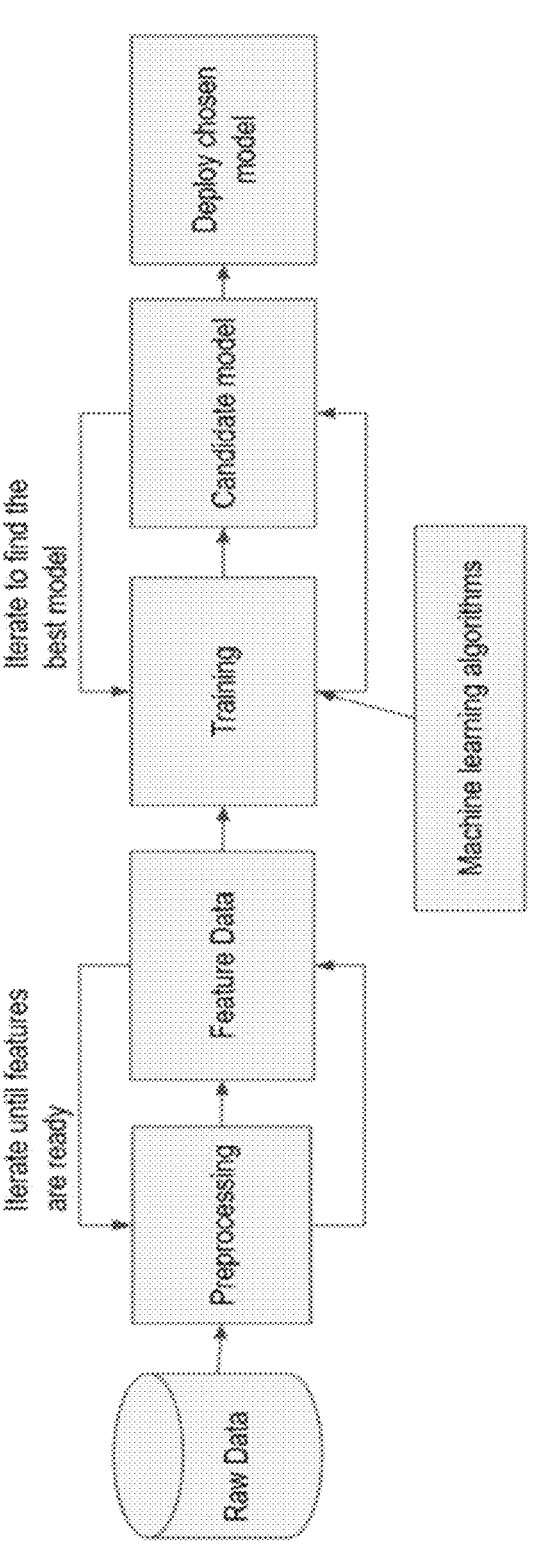
FIG. 3 is a diagram illustrating an example of machine learning procedures according to the present specification.

FIG. 3 is a diagram illustrating an example of machine learning procedures according to the present specification.

Referring to FIG. 3, AutoML is machine learning for improving productivity and efficiency by maximally automating an inefficient task occurring while repeating procedures whenever the machine learning procedures are performed. In the AutoML, various procedures of the machine learning procedures may be targeted. For example, the AutoML may automate procedures such as data pre-processing, feature engineering, model selection, and result analysis.

Figure 4:
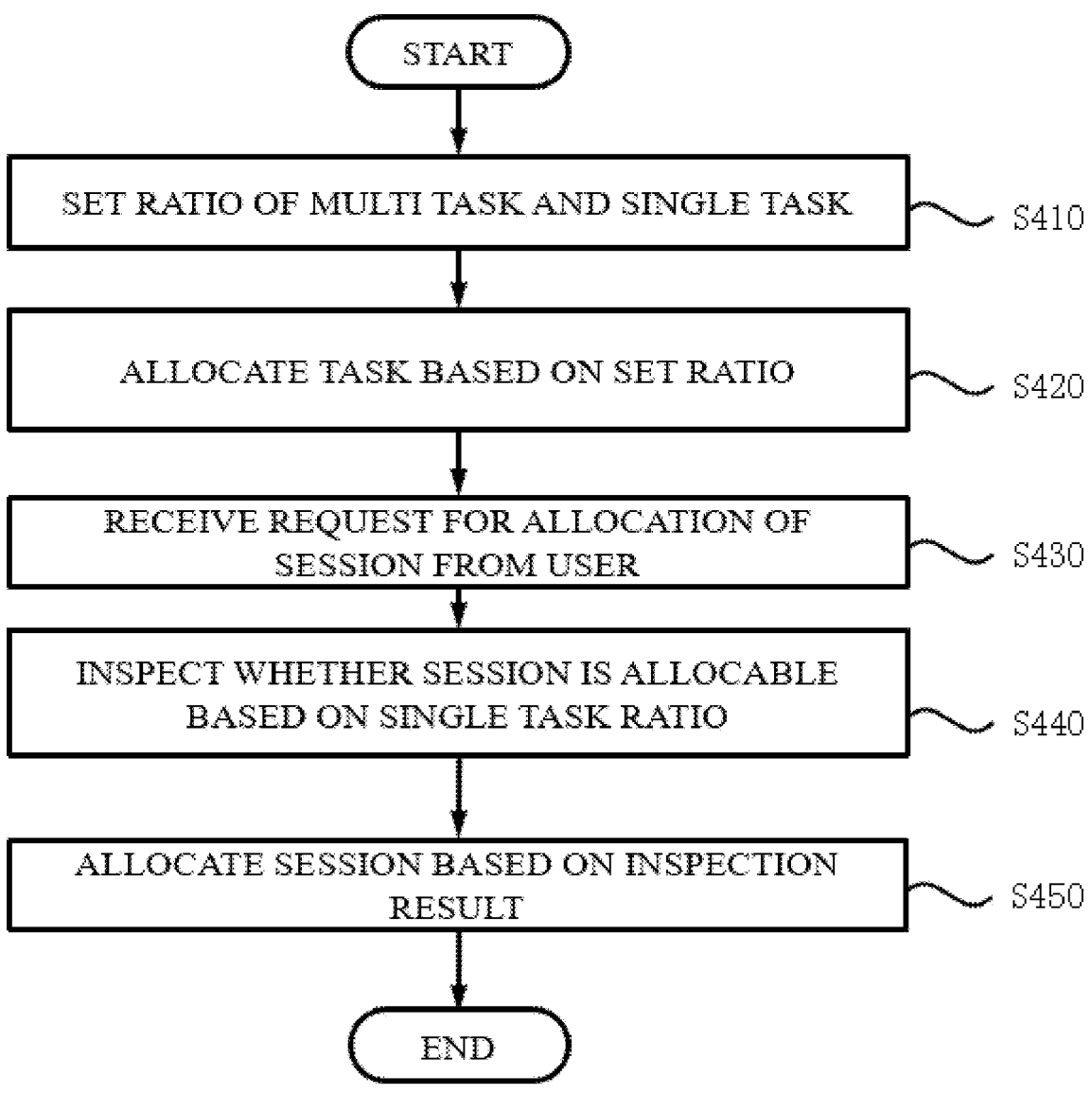
FIG. 4 is a diagram illustrating an example of a scheduling method according to the present specification.

FIG. 4 is a diagram illustrating an example of a scheduling method according to the present specification.

In the present specification, in order to satisfy two purposes of "idle resources are recognized and run" and "Scale In of running resources is immediately enabled", a terminal may include a scheduler for performing task scheduling running on a processor and a monitor for monitoring utilization rates of a cluster. For example, the above-described running may mean tasks including various kinds of AutoML technology such as HPO, feature engineering, and ensemble search.

Referring to FIG. 4, the terminal may be connected to one or more arithmetic devices (e.g., GPUs), schedule a task allocable to the arithmetic device through the scheduler, and monitor a state of each arithmetic device through the monitor.

The terminal sets a ratio of multi task and a single task (S410). For example, the multi task may mean a trial (multi arithmetic device trial) requiring multi (a plurality of) arithmetic devices, and the single task may mean a trial (single arithmetic device trial) requiring a single (one) arithmetic device.

In the present specification, for efficient allocation of user session, the single task may be set higher than a predetermined ratio of the entire allocable tasks. For example, when a request for allocating user session requiring one arithmetic device resource is input to the terminal, the terminal can confirm that all AutoML trials on the cluster use the multi arithmetic devices and that the AutoML trial using the fewest number of arithmetic devices of the multi arithmetic device trials use eight arithmetic devices. In order to allocate the user session, the terminal may terminate the AutoML trial using eight arithmetic devices.

In this case, since the user session is allocated to one arithmetic device, seven idle arithmetic devices additionally occur. Accordingly, such a scheduling method is inefficient.

If a request for allocating an arithmetic device to a user session requiring 5 arithmetic devices comes from a user, the terminal can confirm that the AutoML is pending as 1) AutoML trial of one single arithmetic device and as 2) multi arithmetic device trial requiring three arithmetic devices, and that 3) there is no trial requiring five arithmetic devices.

In this case, the terminal can increase the number of cases of combination such as 1 (AutoML trial of single arithmetic device)+1 (idle arithmetic device)+3 (trial of multi arithmetic devices), terminates the existing AutoML trial by minimizing the idle arithmetic device, and increase probability of allocating the user session.

Accordingly, in the specification, the terminal keeps the number of arithmetic devices for a single task equal to or higher than a predetermined ratio, thereby making probability of more combinations when interrupt for allocation of user session occurs and enabling the efficient use of arithmetic devices.

More specifically, in order to set a task ratio of multi task and single task, the terminal may consider the size of cluster including one or more arithmetic devices. For example, the ratio of the single arithmetic device trial may converge to 50% as the size of the cluster is smaller, and the ratio of the single arithmetic trial may be kept at the ratio lower than that as the size of the cluster is larger. Through this, even when the cluster is small, if the absolute number of single arithmetic devices is equal to or greater than a specific threshold value, it is possible to efficiently use the arithmetic devices as described above. However, since the above-mentioned effect does not increase linearly even when the number of single arithmetic device trials increases above a specific threshold value, the ratio may have a specific threshold value on the basis of the size of the cluster.

The terminal allocates tasks on the basis of the set ratio (S420). For example, the terminal may set the ratio of multi task and a single task in accordance with the set specific threshold value on the basis of the size of the cluster, and allocate tasks in accordance with such ratio. Such a task includes AutoML trial. If it is impossible to allocate tasks in accordance with the set ratio, the ratio may be reset or the task that is not allocable may be reallocated through a monitoring operation to be described later after inserting it to a global queue.

More specifically, the multi task is not just about training using multi arithmetic devices such as distributed data parallel (DDP), but may also include systems that are organically entangled in situations of using multi arithmetic devices such as population based training (PBT). In other words, the multi task refer to a task in which, if a task allocated to one arithmetic device is canceled, the operation of another arithmetic device to which the same task is allocated should be also canceled in a chain.

The terminal receives a request for session allocation from a user (S430). For example, the request for session allocation may include information (e.g., the number of arithmetic devices) of resources necessary to operate the session.

The terminal inspects whether the session is allocable on the basis of the ratio of the single task as a response of the request for session allocation (S440). For example, the terminal checks whether the resources of the request for session allocation can be covered in the ratio of the single task.

The terminal allocates the session on the basis of the inspection whether the session is allocable (S450). For example, if the resources of the request for session allocation can be covered in the ratio of the single task, the terminal may store the single tasks in progress as necessary, insert them to the global queue, and then perform the session allocation to the resources in the ratio of the single task. In other words, the terminal may allocate the resources by prioritizing the request for session allocation than the single task in progress.

If the resource of the request for session allocation cannot be covered in the ratio of the single task as a result of the inspection whether the session is allocable, the terminal may terminate and store a multi task using a resource equal to the resource of the request for session allocation or a multi task closest to and using more resource than the resource of the request for session allocation in the multi task in progress, insert them to the global queue, and then allocate the session to the resource. If the multi task is terminated and there is an idle arithmetic device after the session allocation, a single task included in the global queue which can be covered with the resource of the idle arithmetic device may be additionally allocated.

Figure 5:
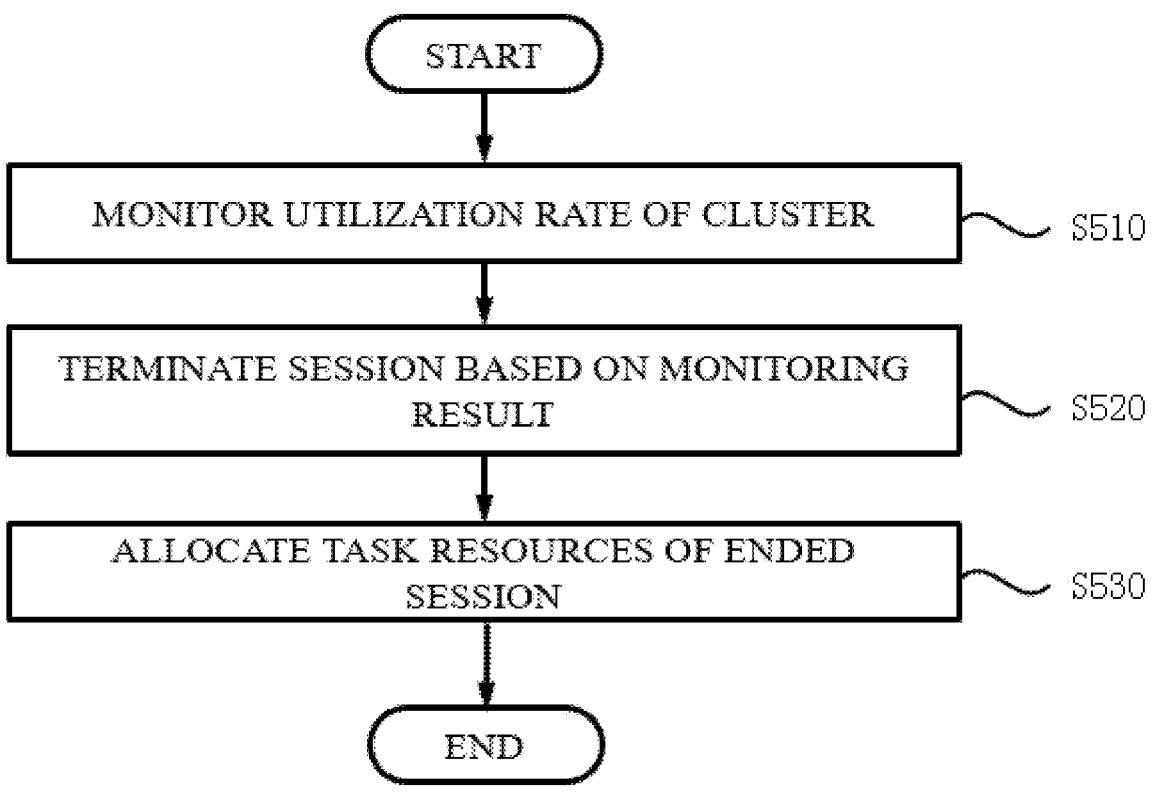
FIG. 5 is a diagram illustrating an example of a monitoring method according to the present specification.

FIG. 5 is a diagram illustrating a monitoring method according to the present specification.

Referring to FIG. 5, for example, a terminal may monitor a utilization rate of a cluster through a monitor.

The terminal monitors the utilization rate of the cluster (S510). For example, the terminal may monitor the utilization rate of the connected cluster. More specifically, the terminal may monitor the utilization rate of the cluster on the basis of resources of session running in the arithmetic devices of the cluster. The session may be the above-described single task or multi task.

The terminal terminates the session on the basis of the result of the monitoring (S520). For example, the terminal may terminate the session of the cluster with the utilization rate of 0. More specifically, the terminal monitors the resources of all the running sessions, and if the utilization rate of any one of a plurality of arithmetic devices used by the sessions is zero for a certain amount of time, a container of the session may be stopped, and then imaged and stored, and the session may be terminated.

The terminal allocates a task to the cluster including the terminated session (S530). For example, the terminal may allocate the AutoML trial to the resource which has been used by the terminated session, by calculating the ratio of single and multi task. Through this, the terminal may automatically allocate the unused idle resource to operate the AutoML task.

In the present specification, the terminal may always perform tasks to improve the performance of a baseline model developed by a researcher while searching a wide search space. In addition, meaningful research resources may always be utilized while idle resources do not occur even when the researcher is not utilizing the resources. Through this, it is possible to improve efficiency of resources of an organization having the on-premise GPU cluster.

The above-described present specification may be implemented as a computer-readable code on a program-recorded medium. The computer-readable medium includes all kinds of recording devices which store data readable by a computer system. Examples of the computer-readable medium are an HDD (Hard Disk Drive), an SSD (Solid State Disk), an SDD (Silicon Disk Drive), a ROM, a RAM, a CD-ROM, a magnetic tape, a floppy disk, an optical data storage device, and the like, and also include what is implemented in a form of carrier wave (e.g., transmission through internet). Accordingly, the above detailed description should not be construed as restrictive in all respects and should be considered as exemplary. The scope of the present specification should be determined by a reasonable interpretation of the appended claims, and all modifications within the equivalent scope of the present specification are included in the scope of the present specification.

In addition, although the above description has been focused on services and embodiments, this is merely an example and does not limit the present specification, and those of ordinary skill in the art can know that various modifications and application not exemplified in the above description are possible in the scope not depart from the essential characteristics of the present service and embodiments. For example, each component specifically represented in the embodiments may be modified and implemented. In addition, differences related to such modifications and applications should be construed as being included in the scope of the present specification defined in the appended claims.

According to an embodiment of the present specification, it is possible to improve the resource efficiency of a system having a GPU cluster.

In addition, according to the present specification, it is possible to efficiently operate an AutoML task by monitoring and automatically allocating unused idle resources.

Effects that can be obtained in the present specification are not limited to the effects mentioned above, and other effects not mentioned will be clearly understood by those of ordinary skill in the art to which the present specification belongs from the description below.

What is claimed is:

1. A method for scheduling a task for AutoML (Automated Machine Learning) by a terminal configured to be connected to a cluster including a plurality of arithmetic devices, the method comprising:

a step of setting a ratio of multi-tasks among entire allocable tasks in the cluster connected to the terminal and a ratio of single-tasks among the entire allocable tasks in the cluster, wherein the plurality of arithmetic devices include Graphics Processing Units (GPUs), each of the multi-tasks is a task requiring two or more arithmetic devices among the plurality of arithmetic devices included in the cluster and each of the single-tasks is a task requiring one arithmetic device among the plurality of arithmetic devices included in the cluster;

a step of allocating tasks including the task for the AutoML on the basis of the set ratio of the multi-tasks and the set ratio of the single-tasks;

a step of receiving a request for allocation of a session from a user, wherein the request for the allocation of the session includes information of a resource required for the session;

a step of inspecting whether the session is allocable on the basis of the set ratio of the single-tasks, wherein the step of inspecting includes determining whether the resource is allocable to the session in the set ratio of the single-tasks; and a step of allocating the session to an arithmetic device used to perform a single-task of the single-tasks among the plurality of arithmetic devices on the basis of the set ratio of the single-tasks when the session is allocable as a result of the inspection, wherein the step of allocating the session to the arithmetic device comprises (i) terminating the single task that is in process using the arithmetic device, and (ii) allocating the session to the arithmetic device, and a step of executing the allocated session by using the arithmetic device, wherein the step of setting the ratio of the single-tasks among the entire allocable tasks in the cluster includes setting the ratio of the single-tasks to be equal to or higher than a predetermined value based on a size of the cluster, and wherein the ratio of the single-tasks among the entire allocable tasks in the cluster is set to be inversely proportional to the size of the cluster and to keep an absolute number of arithmetic devices for the single-tasks in the cluster to be equal to or greater than a specific threshold value.

2. The method for scheduling according to claim 1, wherein in the step of setting the ratio of the multi-tasks and the ratio of the single-tasks, the ratio of the multi-tasks is set to be greater than or equal to the ratio of the single-tasks on the basis of the size of the cluster.

3. The method for scheduling according to claim 2, further comprising a step of allocating the session to arithmetic devices among a number of arithmetic devices included in the plurality of arithmetic devices and used to perform a multi-task of the multi-tasks when the session is not allocable as the result of the inspection.

4. The method for scheduling according to claim 3, wherein the step of allocating the session to the arithmetic devices comprises (i) terminating the multi-task that is in process using the number of arithmetic devices, and (ii) allocating the session to the arithmetic devices among the number of arithmetic devices, wherein the terminated multi-task requires a resource equal to or greater than the resource required for the session.

5. The method for scheduling according to claim 1, further comprising:

a step of monitoring a utilization rate of the cluster based on resources of sessions running in arithmetic devices among the plurality of arithmetic devices in the cluster; and a step of terminating a session of the cluster with the utilization rate of 0 on the basis of the monitoring result.

6. The method for scheduling according to claim 5, further comprising a step of allocating the task for the AutoML to a resource used by the terminated session on the basis of the set ratio of the multi-tasks and the set ratio of the single-tasks.

7. A terminal which schedules a task for AutoML (Automated Machine Learning) and is configured to be connected to a cluster including a plurality of arithmetic devices, the terminal comprising:

a memory storing instructions;

a communication module; and a processor which functionally controls the memory and the communication module, wherein the processor is configured to execute the instructions to:

set a ratio of multi-tasks among entire allocable tasks in the cluster connected to the terminal and a ratio of single-tasks among the entire allocable tasks in the cluster, wherein the plurality of arithmetic devices include Graphics Processing Units (GPUs), each of the multi-tasks is a task requiring two or more arithmetic devices among the arithmetic devices included in the cluster and each of the single-tasks is a task requiring one arithmetic device among the plurality of arithmetic devices included in the cluster;

allocate tasks including the task for the AutoML on the basis of the set ratio of the multi-tasks and the set ratio of the single-tasks;

receive a request for allocation of a session from a user, wherein the request for the allocation of the session includes information of a resource required for the session;

inspect whether the session is allocable on the basis of the set ratio of the single-tasks, wherein the inspecting includes determining whether the resource is allocable to the session in the set ratio of the single-tasks;

allocate the session to an arithmetic device used to perform a single-task of the single-tasks among the plurality of arithmetic devices on the basis of the set ratio of the single-tasks when the session is allocable as a result of the inspection, wherein the allocating of the session to the arithmetic device comprises (i) terminating the single-task that is in process using the arithmetic device, and (ii) allocating the session to the arithmetic device; and execute the allocated session by using the arithmetic device, wherein the setting of the ratio of the single-tasks among the entire allocable tasks in the cluster includes setting the ratio of the single-tasks to be equal to or higher than a predetermined value based on a size of the cluster, and wherein the ratio of the single-tasks among the entire allocable tasks in the cluster is set to be inversely proportional to the size of the cluster and to keep an absolute number of arithmetic devices for the single-tasks in the cluster to be equal to or greater than a specific threshold value.

8. The terminal according to claim 7, wherein the processor is further configured to execute the instructions to monitor a utilization rate of the cluster based on resources of sessions running in arithmetic devices among the plurality of arithmetic devices in the cluster, and terminate a session of the cluster with the utilization rate of 0 on the basis of the monitoring result.

9. The terminal according to claim 8, wherein the processor is further configured to execute the instructions to allocate the task for the AutoML to a resource used by the terminated session on the basis of the set ratio of the multi-tasks and the set ratio of the single-tasks.

10. The terminal according to claim 7, wherein in the setting of the ratio of the multi-tasks and the ratio of the single-tasks, the ratio of the multi-tasks is set to be greater than or equal to the ratio of the single-tasks on the basis of the size of the cluster.

11. The terminal according to claim 10, the processor is further configured to execute the instructions to allocate the session to arithmetic devices among a number of arithmetic devices included in the plurality of arithmetic devices and used to perform a multi-task of the multi-tasks when the session is not allocable as the result of the inspection.

12. The terminal according to claim 11, the processor is further configured to execute the instructions to terminate the multi-task that is in process using the arithmetic devices and allocate the session to the arithmetic devices, wherein the terminated multi-task requires a resource equal to or greater than the resource required for the session.

\* \* \* \* \*